US012746538B2

(12) United States Patent
Kuwahara et al.

(10) Patent No.: US 12,746,538 B2
(45) Date of Patent: Sep. 29, 2026

(54) METHOD FOR MANUFACTURING EXHAUST GAS PURIFICATION CATALYST

(71) Applicant: Cataler Corporation, Kakegawa (JP)

(72) Inventors: Takashi Kuwahara, Kakegawa (JP); Etsuko Ohara, Kakegawa (JP); Ryoma Morita, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 0 days.

(21) Appl. No.: 19/143,077

(22) PCT Filed: Dec. 18, 2023

(86) PCT No.: PCT/JP2023/045172

§ 371 (c)(1),
(2) Date: Jun. 25, 2025

(87) PCT Pub. No.: WO2024/143020

PCT Pub. Date: Jul. 4, 2024

(65) Prior Publication Data

US 2026/0216717 A1 Jul. 30, 2026

(30) Foreign Application Priority Data

Dec. 27, 2022 (JP) ................................ 2022-209909

(51) Int. Cl.
*B01J 37/02* (2006.01)
*B01D 53/94* (2006.01)
(Continued)

(52) U.S. Cl.
CPC .......... *B01J 37/0215* (2013.01); *B01D 53/94* (2013.01); *B01J 23/44* (2013.01); *B01J 35/57* (2024.01);
(Continued)

(58) Field of Classification Search
CPC ..... B01J 37/0215; B01J 37/0028; B01J 37/02
See application file for complete search history.

(56) References Cited

U.S. PATENT DOCUMENTS 6,149,973 A 11/2000 Foerster et al.
2009/0130294 A1* 5/2009 Fehnle ................ B01J 37/0215 118/712
(Continued)

FOREIGN PATENT DOCUMENTS

EP 1067278 A2 1/2001
EP 1067278 B1 * 10/2004 .......... F01N 3/2853
(Continued)

OTHER PUBLICATIONS

Kawai et al. JP 2002242668A translation. 2002 (Year: 2002).*
International Search Report in PCT/JP2023/045172, mailed Feb. 27, 2024 (3 pages).

*Primary Examiner* — Cachet I Proctor
(74) *Attorney, Agent, or Firm* — Young Basile Hanlon & MacFarlane, P.C.

(57) ABSTRACT

A manufacturing method for suppressing a slurry from adhering to a flange part and an uncoated part from forming on a honeycomb structure body. The method of the exhaust gas purification catalyst includes preparing a base material, which includes an outer cylinder having the flange part and the honeycomb structure body, holding the base material to make a cylinder axis of the base material approximately coincide with a vertical direction, inserting a partitioning member, which is formed in a cylindrical shape whose outer diameter is smaller than an inner diameter of the outer cylinder, from a top end of the outer cylinder and arranging to make an end surface at an upward side of the honeycomb structure body and a lower end of the partitioning member
(Continued)

be opposed to each other, supplying the slurry to the partitioning member, and sucking the slurry from a lower end of the outer cylinder.

4 Claims, 11 Drawing Sheets

(51) Int. Cl.

| | |
|---|---|
| ***B01J 23/44*** | (2006.01) |
| ***B01J 35/57*** | (2024.01) |
| ***F01N 3/28*** | (2006.01) |

(52) U.S. Cl.

CPC ......... *F01N 3/2828* (2013.01); *F01N 3/2842* (2013.01); *B01D 2255/1023* (2013.01); *B01D 2255/9155* (2013.01); *B01D 2257/404* (2013.01); *B01D 2257/502* (2013.01); *B01D 2257/702* (2013.01); *B01D 2258/012* (2013.01); *B01D 2258/014* (2013.01); *F01N 2330/06* (2013.01); *F01N 2510/0684* (2013.01)

(56) References Cited

U.S. PATENT DOCUMENTS

| | | | | |
|---|---|---|---|---|
| 2009/0149323 | A1 | 6/2009 | Sunada et al. | |
| 2010/0086696 | A1 | 4/2010 | Tokumaru | |
| 2014/0248464 | A1 | 9/2014 | Soga | |
| 2018/0250630 | A1 * | 9/2018 | Fukuyo .............. | B01D 46/0001 |
| 2021/0086133 | A1 | 3/2021 | Kido et al. | |
| 2021/0170386 | A1 * | 6/2021 | Burgess ................... | B01J 35/56 |

FOREIGN PATENT DOCUMENTS

| | | | | |
|---|---|---|---|---|
| EP | 4166231 | A1 | | 4/2023 |
| JP | S63-51949 | A | | 3/1988 |
| JP | S63-111944 | A | | 5/1988 |
| JP | H11-314041 | A | | 11/1999 |
| JP | 2001017865 | A | | 1/2001 |
| JP | 2002242668 | A | * | 8/2002 |
| JP | 2008302304 | A | | 12/2008 |
| JP | 2009136833 | A | | 6/2009 |
| JP | 6888152 | B1 | | 6/2021 |
| WO | 2008117729 | A1 | | 10/2008 |
| WO | 2013054651 | A1 | | 4/2013 |
| WO | 2020129460 | A1 | | 6/2020 |

* cited by examiner

METHOD FOR MANUFACTURING EXHAUST GAS PURIFICATION CATALYST

TECHNICAL FIELD

A present invention relates to a method for manufacturing an exhaust gas purification catalyst.

The present application is a national phase under 35 USC 371 of International Application No. PCT/JP2023/045172, filed on Dec. 18, 2023, which claims the benefit of the filing date of and priority to Japanese Patent Application No. 2022-209909 filed on Dec. 27, 2022. The entire contents of these applications are hereby incorporated herein by reference in their entireties.

BACKGROUND ART

An exhaust gas, which is exhausted from the internal combustion engine of a vehicle or the like, contains a harmful component, such as nitrogen oxide (NOx), hydrocarbon (HC: Hydro-Carbon), and carbon monoxide (CO). In order to efficiently react with or remove the harmful component of the exhaust gas, the exhaust gas purification catalyst is conventionally used. The exhaust gas purification catalyst as described above includes, for example, a base material in which plural exhaust gas flow paths (cells) are partitioned by partition walls and which is formed to have a honeycomb structure, and a catalyst layer which is provided on a surface of the partition wall of the base material and/or an inside. The catalyst layer contains a catalyst metal (for example, palladium, rhodium, platinum, or the like) that can oxidize or reduce an exhaust gas component so as to purify it.

As an example of a manufacturing method of the above described exhaust gas purification catalyst, a method is known that, by supplying a catalyst layer forming slurry to one of end surfaces of the honeycomb base material and sucking it from the other end surface side, pulls the slurry to an inside of the base material. For example, Patent Document 1 discloses the manufacturing method of the exhaust gas purification catalyst that can efficiently perform the exhaust gas purification in accordance with a shape of an exhaust pipe.

CITATION LIST

Patent Document

[Patent Document 1] Japanese Patent Application Publication No. 2009-136833

[Patent Document 2] Japanese Patent Application Publication No. S63-111944

[Patent Document 3] Japanese Patent Application Publication No. S63-51949

SUMMARY OF INVENTION

Anyway, as the base material, it is possible to use a base material including a flange part in which both ends of an outer cylinder are configured to protrude more than the end surface of the honeycomb structure body (below, which is referred to as "base material with flange", too). Patent Documents 2 and 3 disclose the manufacturing methods of the exhaust gas purification catalysts regarding a situation where the base material with flange is used as the base material. Patent Document 2 discloses the manufacturing method in which a filling material is arranged at an outer periphery part of the honeycomb structure body to form a catalyst layer at a center part of the honeycomb structure body. Patent Document 3 discloses, in order to inhibit the slurry from adhering on an inner periphery surface and an outer periphery surface of the outer cylinder regarding the situation where the base material with flange is used, that the slurry is supplied, after an elastic cylinder body whose diameter can be expanded by an air pressure is inserted into the base material and then pressure feeding of air is performed into the elastic cylinder body so as to make it closely bond to the inner periphery surface of the outer cylinder.

As a result of the present inventors' study, in the situation where the base material with flange is used, it is possible, by arranging a partitioning member, which is configured to temporarily hold the supplied slurry, at an inner wall side of the flange part, to suppress the adhesion of the slurry on the flange part. On the other hand, the partitioning member as described above sometimes collided (interfered) with the flange part mutually when it was arranged, and thus, sometimes, the partitioning member was not arranged suitably. In a situation where the partitioning member is not arranged at a suitable position, there is a fear that the supplied slurry is excessively diffused so as to adhere to the flange part or that the slurry is not diffused so as to cause an uncoated part on the honeycomb structure body. In addition, as a result of the present inventors' further study, in a situation where a viscosity of the supplied slurry is not suitably adjusted, there is a fear that the slurry adheres to the flange part or that the uncoated part is caused. In a situation where a large amount of the slurry adheres to the flange part, it is not preferable because a welding failure, or the like, could be caused when, for example, it is accommodated in a metal case together with a mat (when so-called canning is performed). Additionally, in a situation where the uncoated part is caused on the honeycomb structure body, a suitable catalyst function can not be exhibited at each part, and thus it is not preferable. Therefore, still, there was a room for improving the manufacturing method of the exhaust gas purification catalyst in the situation where the base material with flange was used.

A present disclosure has been made in view of the above-described circumstances to provide a manufacturing method that can suppress, in the situation where a base material including a flange part is used, the slurry from adhering to the flange part and can suppress the uncoated part from being caused on the honeycomb structure body.

In order to implement the object described above, a herein disclosed technique provides a manufacturing method having a configuration described below.

The herein disclosed manufacturing method (1) is a manufacturing method of an exhaust gas purification catalyst that is configured to purify an exhaust gas exhausted from an internal combustion engine, the manufacturing method comprising: a step for preparing a base material that comprises an outer cylinder and a honeycomb structure body being arranged at an inside of the outer cylinder and being formed in a manner where the exhaust gas can flow, the honeycomb structure body having a length in a cylinder axis direction being shorter than the outer cylinder, the outer cylinder comprising a flange part protruding toward the cylinder axis direction more than an end surface of the honeycomb structure body on at least one of end parts toward the cylinder axis direction; a step for holding the base material to make a cylinder axis of the base material approximately coincide with a vertical direction; a step for inserting a partitioning member, which is formed in a cylindrical shape whose outer diameter is smaller than an inner diameter of the outer cylinder, from a top end of the outer cylinder, and then arranging so as to make the end surface at an upward side of the honeycomb structure body be opposed to a lower end of the partitioning member; a step for supplying a catalyst layer forming slurry, which comprises a catalyst metal, to the partitioning member; and a step for sucking the catalyst layer forming slurry from a lower end of the outer cylinder. At the arranging step, the partitioning member is arranged to make a clearance X between the end surface of the honeycomb structure body and the lower end of the partitioning member, which are arranged to be opposite to each other, become equal to or more than 0.5 mm and not more than 2 mm and to make a value of a clearance Y between an inner wall of the flange part of the base material and an outer wall of the partitioning member become equal to or more than 0.5 mm and not more than 2 mm. The catalyst layer forming slurry supplied at the supplying step is characterized by satisfying Formula (1): $V_4 \geq 2500X$; and Formula (2): $V_{150} \leq 1150X$, when a viscosity at a time of a shearing speed being 4 $sec^{-1}$ is treated as the $V_4$ (mPa·s) and the viscosity at a time of the shearing speed being 150 $sec^{-1}$ is treated as the $V_{150}$ (mPa·s).

By arranging the partitioning member, whose outer diameter is smaller than the inner diameter of the outer cylinder, on the base material so as to include a predetermined clearance, and by suitably adjusting the viscosity of the supplied slurry, it is possible to suitably coat the inside of the base material with the slurry. According to the configuration described above, for the base material including the outer cylinder, the honeycomb structure body, and the flange part, it is also possible to implement the manufacturing method that suppresses the slurry from adhering to the flange part and suppresses the uncoated part from being caused on the honeycomb structure body.

Regarding a herein disclosed manufacturing method (2), in the manufacturing method (1), the catalyst layer forming slurry supplied at the supplying step is prepared to make the viscosity $V_4$ at the time when the shearing speed is 4 $sec^{-1}$ become equal to or less than 20000 mPa·s.

According to the configuration described above, it is possible to further suitably supply the catalyst layer forming slurry to the partitioning member.

Regarding the herein disclosed manufacturing method (3), in the manufacturing method (1) or (2), the catalyst layer forming slurry supplied at the supplying step is prepared to make the viscosity $V_{150}$ at the time when the shearing speed is 150 $sec^{-1}$ become equal to or more than 300 mPa·s.

According to the configuration described above, the catalyst layer forming slurry is suitably introduced to the inside of the base material.

DESCRIPTION OF EMBODIMENTS

Below, by reference to the accompanying drawings, a preferred embodiment of the present disclosure would be explained. Incidentally, the matters other than matters particularly mentioned in this description but required for performing the present disclosure can be grasped as design matters of those skilled in the art based on the related art in the present field. The present disclosure can be executed based on the contents disclosed in the present description, and the technical common sense in the present field. Additionally, in the following accompanying drawings, the members/parts providing the same effect are provided with the same numerals and signs and then overlapping explanations might be omitted or simplified. The dimensional relation (a length, a width, a thickness, or the like) in each drawing might not always reflect the actual dimensional relation. In addition, a wording "A to B" (A and B are arbitrary numbers) representing a range in the present description means to be equal to or more than A and not more than B.

<Exhaust Gas Purification Catalyst>

An exhaust gas purification catalyst obtained by a herein disclosed manufacturing method can be arranged on an exhaust system (an exhaust pipe) of various internal combustion engines, especially a diesel engine or a gasoline engine of a car. Then, the exhaust gas purification catalyst described above has a function of purifying a harmful component (HC, CO, NOx, or the like) in the exhaust gas having been exhausted from this internal combustion engine.

Figure 1:
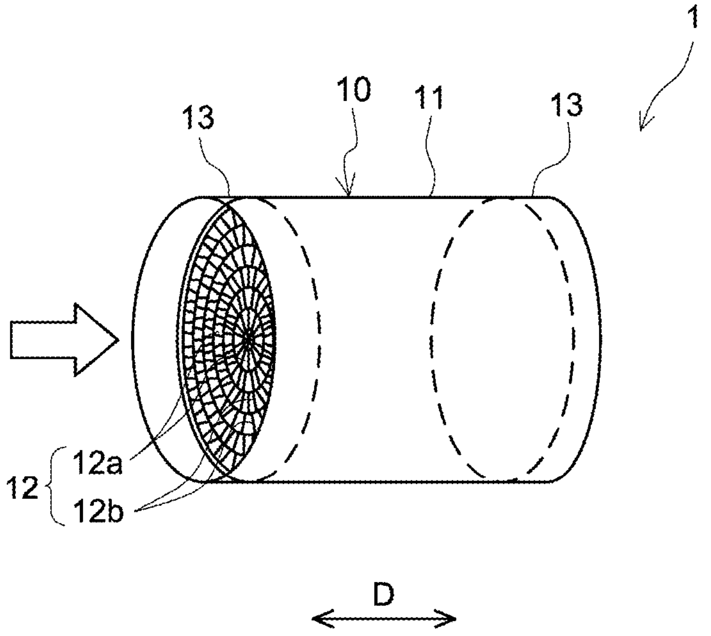
FIG. 1 is a perspective view that schematically shows an exhaust gas purification catalyst in accordance with one embodiment.
Figure 2:
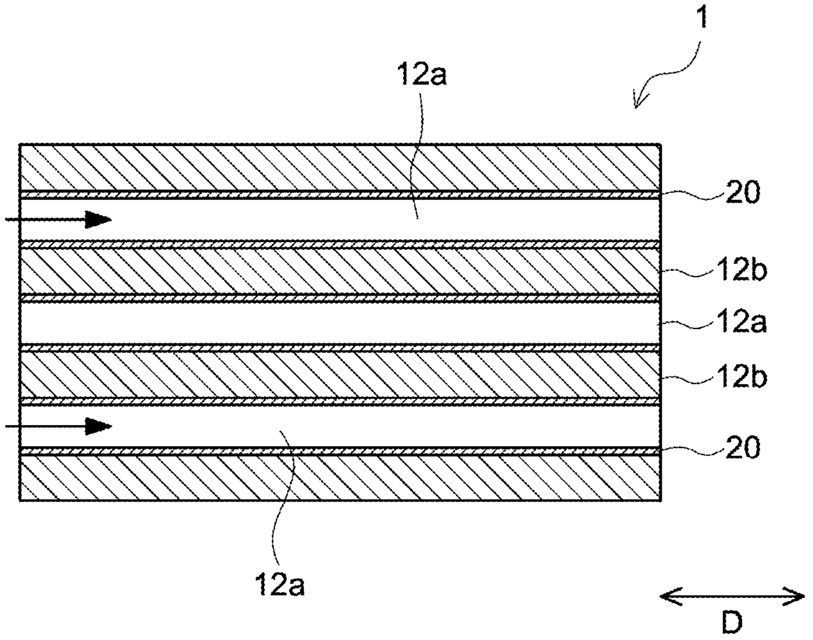
FIG. 2 is a view that schematically shows a configuration of the exhaust gas purification catalyst in accordance with one embodiment.

FIG. 1 is a perspective view that schematically shows an exhaust gas purification catalyst 1 obtained by the herein disclosed manufacturing method. FIG. 2 is a view that schematically shows a structure of the exhaust gas purification catalyst 1 shown by FIG. 1. Incidentally, arrows of FIG. 1 and FIG. 2 represent directions in which the exhaust gas flows when the exhaust gas purification catalyst 1 is arranged on the exhaust system of the internal combustion engine. In other words, regarding FIG. 1 and FIG. 2, a left side is an upstream side (a front side) relatively closer to the internal combustion engine and a right side is a downstream side (a rear side) relatively far from the internal combustion engine. Additionally, in FIG. 1 and FIG. 2, a reference sign D represents a cylinder axis direction of the exhaust gas purification catalyst 1. The exhaust gas purification catalyst 1 is disposed on an exhaust path of the internal combustion engine to make the cylinder axis direction D become along a flow direction of the exhaust gas.

As shown in FIG. 1 and FIG. 2, the exhaust gas purification catalyst 1 includes a base material 10 having a straight flow structure, and a catalyst layer 20. The base material 10 is a member that configures a skeleton of the exhaust gas purification catalyst 1 and that extends along the cylinder axis direction D. The base material 10 includes an outer cylinder 11 and a honeycomb structure body 12 that is arranged at an inside of the outer cylinder 11. The outer cylinder 11 is provided with a flange part 13 on at least one of end parts toward the cylinder axis direction D, and the flange part is configured to protrude toward the cylinder axis direction D more than an end surface of the honeycomb structure body 12. In an example shown by FIG. 1, the outer cylinder 11 includes the flange parts 13 at both end parts in the cylinder axis direction D. At an inner surface side (an inner wall side) of the flange part 13, the honeycomb structure body 12 is not arranged.

The honeycomb structure body 12 includes plural cells 12*a* that extend along the cylinder axis direction D, and a partition wall 12*b* that partitions the cells 12*a*. The cell 12*a* is a part in which the exhaust gas can flow, and has both ends in the cylinder axis direction D being opened. As shown in FIG. 2, on a surface of the partition wall 12*b*, the catalyst layer 20 is formed. The exhaust gas having flowed into the exhaust gas purification catalyst 1 comes into contact with the catalyst layer 20 while flowing in an exhaust gas path (here, the inside of the cell 12*a*) of the exhaust gas purification catalyst 1. By doing this, the harmful component in the exhaust gas is purified. For example, the HC and the CO contained in the exhaust gas are oxidized by a catalyst function of the catalyst layer 20 and are converted into a water, a carbon dioxide, or the like (purified). In addition, for example, the NOx is reduced by the catalyst function of the catalyst layer 20 and is converted into a nitrogen (purified).

The catalyst layer 20 is a layer that contains a catalyst metal. The catalyst metal is a metal that can function as an oxidation catalyst and/or a reduction catalyst for purifying the harmful component, such as the HC, the CO, and the NOx, as described above. As an example of this kind of catalyst metal, it is possible to use a platinum group, in short, rhodium (Rh), palladium (Pd), platinum (Pt), ruthenium (Ru), osmium (Os), and iridium (Ir). In addition, it is possible to use one in which two or more kinds of metals among the above described metals are alloyed. Among them, an oxidation catalyst having a high oxidation activity (for example, at least one of Pd and Pt) and a reduction catalyst having a high reduction activity (for example, Rh) can be used as suitable catalyst metals.

The catalyst layer 20 might contain a carrier, in addition to the catalyst metal. The carrier is a material that carries the catalyst metal. The carrier is not particularly restricted, and it is possible to use a conventionally used inorganic chemical compound among this kind of catalysts. For example, it is good that the carrier is an inorganic porous body whose specific surface area is large. Incidentally, the wording "specific surface area" in the present description represents a specific surface area measured by a BET method, unless otherwise described. As the carrier, it is possible to use, for example, a metal oxide, such as alumina ($Al_2O_3$), zirconia ($ZrO_2$), silica ($SiO_2$), ceria ($CeO_2$), and titania ($TiO_2$), a solid solution of it (for example, a ceria-zirconia composite oxide, or the like), or a combination of them.

<Manufacturing Apparatus>

Figure 3:
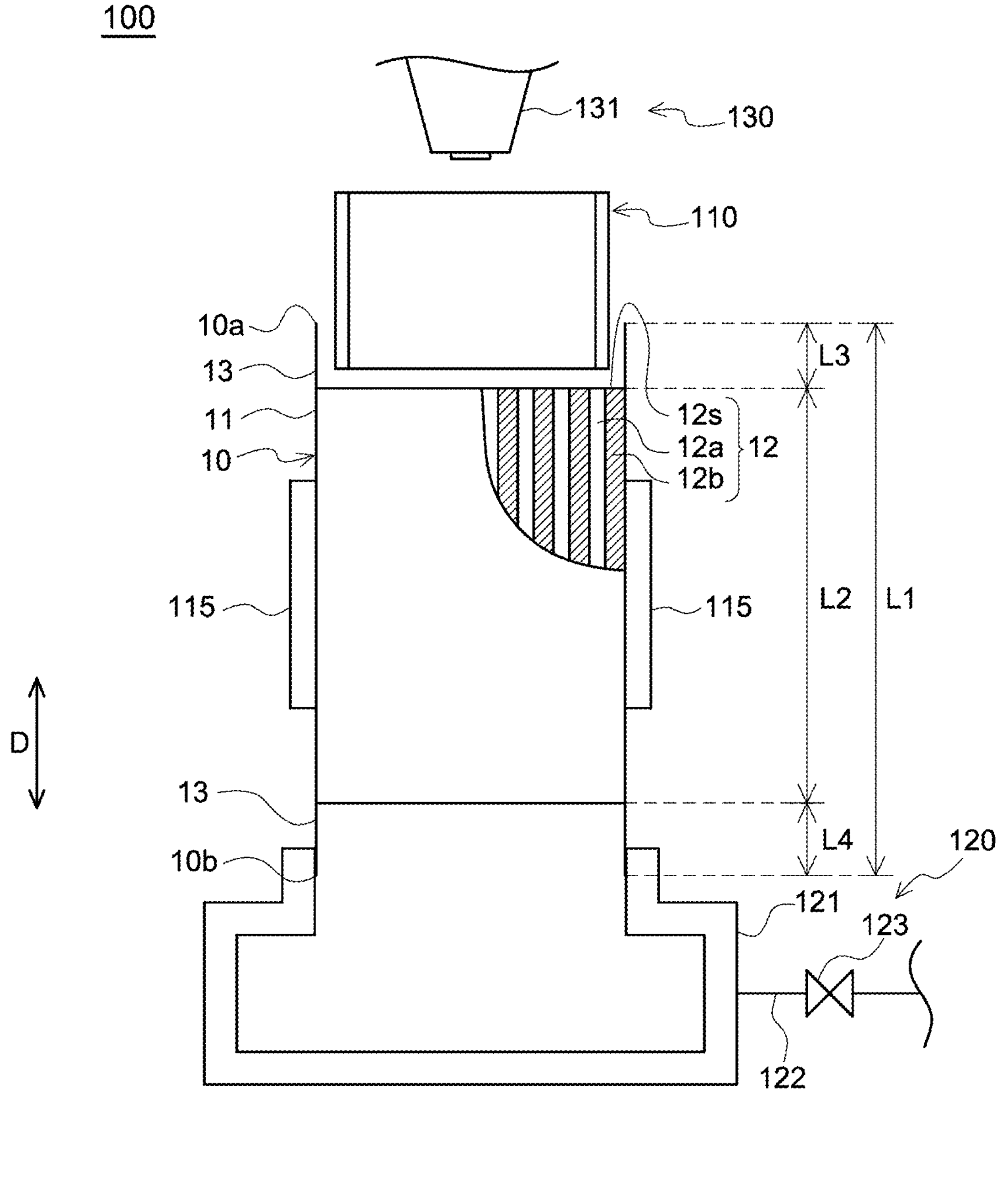
FIG. 3 is a view that schematically shows a manufacturing apparatus in accordance with one embodiment.

FIG. 3 is a view that schematically shows a manufacturing apparatus 100 used for the herein disclosed manufacturing method. The manufacturing apparatus 100 includes a holding member 115 that holds the base material 10 to make a cylinder axis of the base material 10 approximately coincide with a vertical direction (a gravity direction), a partitioning member 110 that temporarily holds a catalyst layer forming slurry at a top end 10*a* side of the base material 10, a sucking member 120 that sucks this catalyst layer forming slurry from a lower end 10*b* side of the base material 10 in the cylinder axis direction D, and a supplying member 130 that supplies this catalyst layer forming slurry to an internal space of the partitioning member 110.

The holding member 115 holds the base material 10 in a detachable manner. The holding member 115 holds, as shown in FIG. 3, between a later described base material receiving part 121 and a discharging part 131 of the supplying member 130 to make the cylinder axis of the base material 10 be approximately vertical. In other words, the holding member 115 holds the base material 10 so as to make the cylinder axis direction D of the base material 10 (the outer cylinder 11) approximately coincide with the vertical direction (the gravity direction). Incidentally, in the present description, the wording "approximately coincide with the vertical direction" is to semantically cover a range being about ±5° with respect to a perpendicular line extending from a surface on which the manufacturing apparatus is disposed.

The holding member 115 holds the base material 10 so as to make the end part at a side including the flange part 13 be arranged at an upward side. The holding member 115 is not particularly restricted insofar as it can hold the base material 10. The holding member 115 might be, for example, a mechanical chuck configured to mechanically hold the base material 10, a vacuum chuck configured to use a negative pressure so as to hold the base material 10, a magnetic chuck configured to use a magnetic force so as to hold the base material 10, or the like.

The partitioning member 110 temporarily holds the catalyst layer forming slurry, which is supplied from the top end 10*a* side of the base material 10, on an end surface 12*s* at the upward side of the honeycomb structure body 12. In addition, the partitioning member 110 could have a function of adjusting a position, to which the slurry is supplied to the base material 10. The partitioning member 110 is a member having the internal space. The partitioning member 110 is a member which is formed in a cylindrical shape and whose both ends are opened. The partitioning member 110 can, for example, accommodate the catalyst layer forming slurry in the internal space. A material of the partitioning member 110 is not particularly restricted if the material has a chemical resistance property or a corrosion resistance property, and it might be made of metal (for example, made from stainless steel) or made of resin (for example, made from polyethylene).

An outer diameter of the partitioning member 110 is designed to be smaller than an inner diameter of the outer cylinder 11. For example, it is good that the outer diameter of the partitioning member 110 is smaller than the inner diameter of the outer cylinder 11 by about 1 mm to 4 mm. By doing this, the partitioning member 110 and the flange part 13 do not collide with (interfere with) each other, and thus it is possible to easily insert from the top end 10*a* side of the base material 10. The partitioning member 110 is arranged at a position where an outer wall is opposed to an inner wall of the flange part 13. In other words, a lower end of the partitioning member 110 is arranged at a position invading to the end surface 12*s* side of the honeycomb structure body 12 more than a top end of the flange part 13. The partitioning member 110 might include a diameter expanded part at the top end side, and a diameter of the diameter expanded part is expanded toward an upward. By making the partitioning member 110 include the diameter expanded part, it is possible to suitably accommodate the catalyst layer forming slurry at the inside of the partitioning member 110. Incidentally, in a situation where the partitioning member 110 includes the diameter expanded part, it might be good that the outer diameter of the diameter expanded part is larger than the inner diameter of the base material if the outer diameter at a lower end side than the diameter expanded part is smaller than the inner diameter of the outer cylinder.

The sucking member 120 introduces the slurry to the inside of the base material 10 by sucking the catalyst layer forming slurry, supplied to the top end 10*a* side of the base material 10, from the lower end 10*b* side. The sucking member 120 could include, for example, the base material receiving part 121 that has an internal space, a sucking device (not shown in drawings) that is connected to the internal space of the base material receiving part 121 through a pipe 122, and an open/close valve 123 that is configured to open and close the pipe 122. The base material receiving part 121 includes an opening that is formed to allow insertion of the base material 10. As shown in FIG. 3, by inserting the lower end 10*b* of the base material 10 into the opening of the base material receiving part 121, the base material receiving part 121 and an outer wall of the base material 10 are closely bonded, and thus the lower end 10*b* of the base material 10 reaches to the internal space of the base material receiving part 121. The base material 10 is held to be approximately vertical by the base material receiving part 121. By driving the sucking device in this state, the gas (for example, air) inside the honeycomb structure body 12 is sucked, and thus it is possible to introduce the catalyst layer forming slurry to the inside of the base material 10.

The supplying member 130 supplies a later described catalyst layer forming slurry into the internal space of the partitioning member 110. The supplying member 130 includes, for example, the discharging part 131 that discharges the slurry, a storage tank (not shown in drawings) that temporarily stores the slurry, a pipe (not shown in drawings) that connects the storage tank and the discharging part 131. However, the supplying member 130 is not particularly restricted, insofar as it can supply the catalyst layer forming slurry to the partitioning member 110. The supplying member 130 is configured to supply a predetermined amount of slurry to the partitioning member 110.

<Manufacturing Method of the Exhaust Gas Purification Catalyst>

Figure 4:
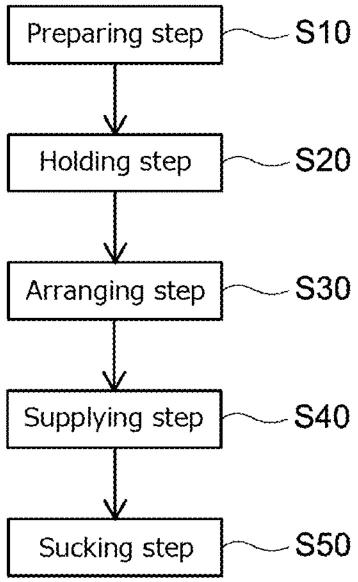
FIG. 4 is a flowchart view that shows a step of a manufacturing method of the exhaust gas purification catalyst in accordance with one embodiment.

FIG. 4 is a flowchart view that shows rough steps of the herein disclosed manufacturing method of the exhaust gas purification catalyst. The herein disclosed manufacturing method can be suitably performed with the manufacturing apparatus 100 as described above. The herein disclosed manufacturing method includes a preparing step S10 that prepares the base material 10 including the outer cylinder 11 having the flange part 13 and including the honeycomb structure body 12, a holding step S20 that holds the base material 10 to make the cylinder axis direction D of the base material 10 approximately coincide with the vertical direction, an arranging step S30 that arranges the partitioning member 110 on the base material 10, a supplying step S40 that supplies the catalyst layer forming slurry to the partitioning member 110, and a sucking step S50 that sucks this slurry. The herein disclosed manufacturing method is characterized by inserting the partitioning member 110, whose outer diameter is smaller than the inner diameter of the outer cylinder 11, from the top end 10*a* side of the base material 10 at the arranging step S30 so as to perform the arrangement in which a clearance between the base material 10 and the partitioning member 110 is within a specific range, and by adjusting to make the viscosity of the catalyst layer forming slurry supplied at the supplying step S40 be within a specific range, and the other manufacturing processes might be similar to conventional ones. In addition, it might further include another step at an arbitrary stage.

At the preparing step S10, the base material 10 is prepared. The base material 10 is a member that configures a skeleton of the exhaust gas purification catalyst 1 as described above. In the herein disclosed manufacturing method, the base material 10 is prepared that includes the outer cylinder 11 having the flange part 13 and includes the honeycomb structure body 12. The base material 10 is a metal base material that is, for example, configured with a stainless steel (SUS). The base material 10 can be prepared, for example, by doing as described below. At first, the outer cylinder 11 made of metal (for example, made from stainless steel) is prepared. Next, by overlaying a metal foil molded in a wave shape on a metal foil formed in a flat plate shape and then winding in a roll shape manner, the honeycomb structure body 12 is prepared. It is formed so as to make a length of the honeycomb structure body 12 in the cylinder axis direction D be shorter than a length of the outer cylinder 11 in the cylinder axis direction D. Then, this honeycomb structure body 12 is inserted into the outer cylinder 11. At that time, to make the end part of the outer cylinder 11 protrude toward the cylinder axis direction D more than the end surface of the honeycomb structure body 12 at any of the end parts of the outer cylinder 11 in the cylinder axis direction D, the honeycomb structure body 12 is inserted into the outer cylinder 11. By doing this, it is possible to prepare the base material 10 that includes the outer cylinder 11 having the flange part 13 and includes the honeycomb structure body 12. Incidentally, the base material 10 might be, for example, a metal base material, other than the SUS-made one, such as Fe—Cr—Al base alloy and Ni—Cr—Al base alloy, or might be a ceramic base material configured with ceramic, such as cordierite, aluminium titanate, and silicon carbide.

The base material 10 of the present embodiment includes a honeycomb structure body 12 that is formed in a manner where the exhaust gas can flow. As shown in FIG. 1 and FIG. 2, the honeycomb structure body 12 includes the plural cells 12*a* that are regularly arranged in the cylinder axis direction D and includes the partition wall 12*b* that partitions the plural cells 12*a*. The cell 12*a* is a path in which the exhaust gas flows, and which extends along the cylinder axis direction D. The cell 12*a* is a penetration hole that penetrates the base material 10 in the cylinder axis direction D. A shape, a size, a number, or the like, of the cell 12*a* might be designed, for example, in consideration of a flow amount, a component, or the like, of the exhaust gas supplied to the exhaust gas purification catalyst 1. The partition wall 12*b* faces to the cells 12*a* and partitions a portion between the adjacent cells 12*a*. Although not particularly restricted, a capacity of the base material 10 (an apparent volume containing a capacity of the cell 12*a*) is approximately equal to or more than 0.01 L, for example, equal to or more than 0.1 L, and equal to or less than approximately 6 L, for example, equal to or less than 1 L, or equal to or less than 0.5 L. In addition, although not particularly restricted, a thickness of the partition wall 12*b* is, from a perspective of enhancing a mechanical strength, reducing a pressure loss, or the like, approximately equal to or more than 10 μm, for example, equal to or more than 20 μm, and equal to or less than approximately 500 μm, for example, equal to or less than 200 μm, equal to or less than 100 μm.

The honeycomb structure body 12 includes a honeycomb structure that is formed with the plural cells 12*a* as described above and with the partition wall 12*b*. Incidentally, in the present description, the wording "honeycomb structure" can semantically cover not only one in which a cross section shape of the cell 12*a* orthogonal to the cylinder axis direction D is a hexagon, but also ones in which the cross section shapes of the cells 12*a* are rectangular shapes, such as square, parallelogram, rectangle, and trapezoidal, or various geometric shapes, such as the other polygon (for example, triangle, or octagon), wave shape, and circular shape.

In the present embodiment, as shown by FIG. 3, a length L1 of the outer cylinder 11 along the cylinder axis direction D is longer than a length L2 of the honeycomb structure body 12, which is arranged inside this outer cylinder 11, along the cylinder axis direction D. Although not particularly restricted, the length L1 of the outer cylinder 11 along the cylinder axis direction D might be approximately equal to or more than 40 mm, for example, equal to or more than 50 mm, or equal to or more than 60 mm, and might be approximately equal to or less than 230 mm, for example, equal to or less than 200 mm, or equal to or less than 150 mm. In addition, the length L2 of the honeycomb structure body 12 along the cylinder axis direction D might be approximately equal to or more than 20 mm, for example, equal to or more than 40 mm, or equal to or more than 60 mm, and might be approximately equal to or less than 190 mm, for example, equal to or less than 130 mm, or equal to or less than 100 mm.

It is enough for the flange part 13 to be provided on at least one of the end parts of the outer cylinder 11 in the cylinder axis direction D. Although not particularly restricted, a length L3 of the flange part 13 in the cylinder axis direction D at the upward side (the top end 10*a* side) of FIG. 3 is preferably, for example, equal to or more than 3 mm and not more than 50 mm, might be equal to or more than 4 mm and not more than 40 mm, or might be equal to or more than 5 mm and not more than 30 mm. The length L3 of the flange part 13 in the cylinder axis direction D means, in other words, a distance from a top end 10*a* of the base material 10 to the end surface 12*s* of the honeycomb structure body 12 at the upward side. In addition, as shown by FIG. 3, the outer cylinder 11 might include the flange parts 13 on the both end parts in the cylinder axis direction D. In the situation where the outer cylinder 11 includes the flange parts 13 on the both end parts in the cylinder axis direction D, a length L4 of the flange part 13 in the cylinder axis direction D at the downward side (the lower end 10*b* side) of FIG. 3 might be similar to the above described length L3, or might be different from it. Preferably, in the situation where the flange parts are provided on the both end parts of the outer cylinder 11 in the cylinder axis direction D, it is good that the lengths of two flange parts are similar to each other.

The inner diameter of the outer cylinder 11, which is not particularly restricted, is preferably, for example, equal to or more than 20 mm and not more than 200 mm, or might be approximately equal to or more than 30 mm and not more than 190 mm. In the present embodiment, the honeycomb structure body 12 is arranged at the inside of the outer cylinder 11. The outer diameter of the honeycomb structure body 12 is not particularly restricted, if it can be inserted into the outer cylinder 11. In other words, the outer diameter of the honeycomb structure body 12 could be designed slightly smaller than the inner diameter of the outer cylinder 11. Additionally, in an example shown by FIG. 1, the outer shape of the base material 10 is a cylindrical shape. However, the outer shape of the base material 10 is not particularly restricted, insofar as the partitioning member 110 can be arranged at the later described arranging step S30. For example, the outer shape of the base material 10 might be an elliptic cylinder shape, or the like.

At the holding step S20, the base material 10 is held to make the cylinder axis of the above prepared base material 10 approximately coincide with the vertical direction. In other words, the base material 10 is held by the holding member 115 to make the cylinder axis direction D of the base material 10 and the vertical direction approximately coincide with each other. At that time, the base material 10 is held to make the flange part 13 be arranged at an upward. In addition, it is preferable that the base material 10 is held to make the end surface 12*s* of the honeycomb structure body 12 be approximately horizontal. By doing this, it is possible to suitably perform the arranging step S30 and the supplying step S40 described later.

Figure 5:
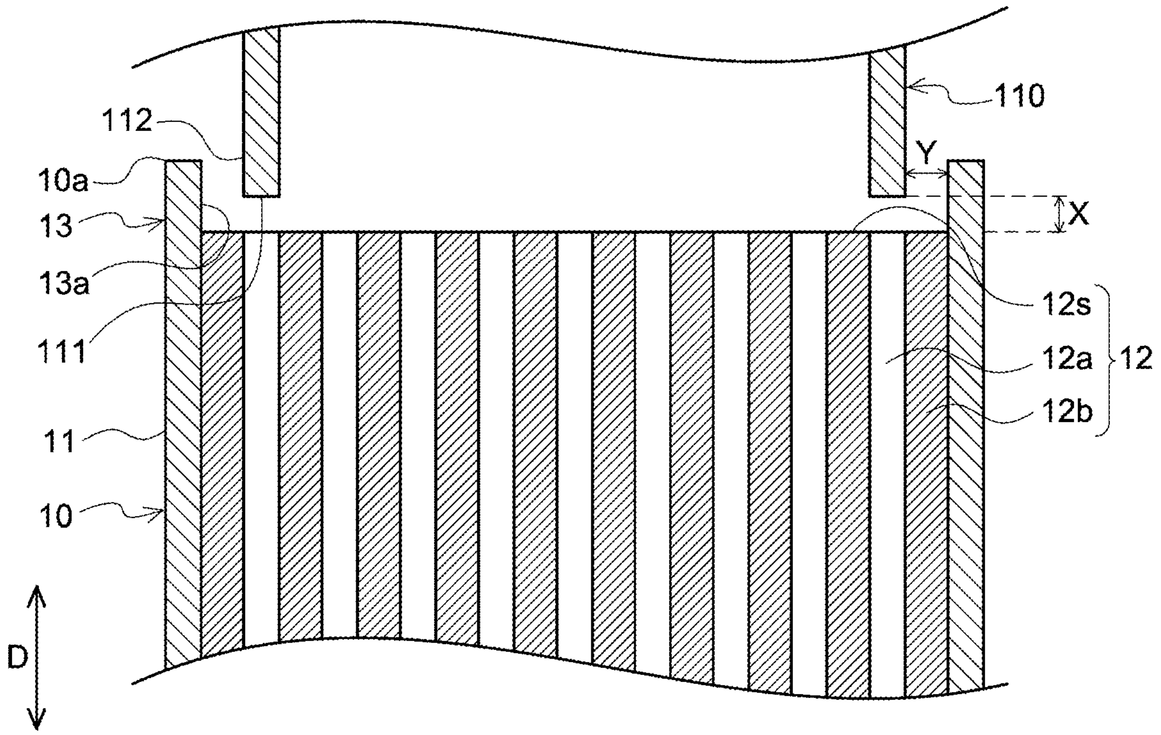
FIG. 5 is a view that schematically shows an arranging step in accordance with one embodiment.

FIG. 5 is a view that schematically shows a situation of the arranging step. At the arranging step S30, the partitioning member 110 is arranged on the held base material 10 described above. The partitioning member 110 is inserted from the top end 10*a* side of the base material 10, and arranged to make a lower end 111 of the partitioning member 110 be opposed to the end surface 12*s* at the upward of the honeycomb structure body 12. The partitioning member 110 is arranged at a position invading into the end surface 12*s* side of the honeycomb structure body 12 more than the top end 10*a* of the base material 10 (more particularly, a top end of the flange part 13). The partitioning member 110 is arranged at a position where an outer wall 112 at the lower end 111 side and an inner wall 13*a* of the flange part 13 are opposed to each other. At that time, as shown in FIG. 5, the end surface 12*s* at the upward of the honeycomb structure body 12 and the lower end 111 of the partitioning member 110 do not directly come into contact with each other, and are spaced away from each other. In addition, the inner wall 13*a* of the flange part 13 and the outer wall 112 of the partitioning member 110 do not directly come into contact with each other, and are spaced away from each other. The outer diameter of the partitioning member 110 is, as described above, designed to be smaller than the inner diameter of the outer cylinder 11. Thus, the partitioning member 110 and the flange part 13 do not interfere with each other, and it is possible to easily arrange the partitioning member 110 at a position as described above.

Figure 8:
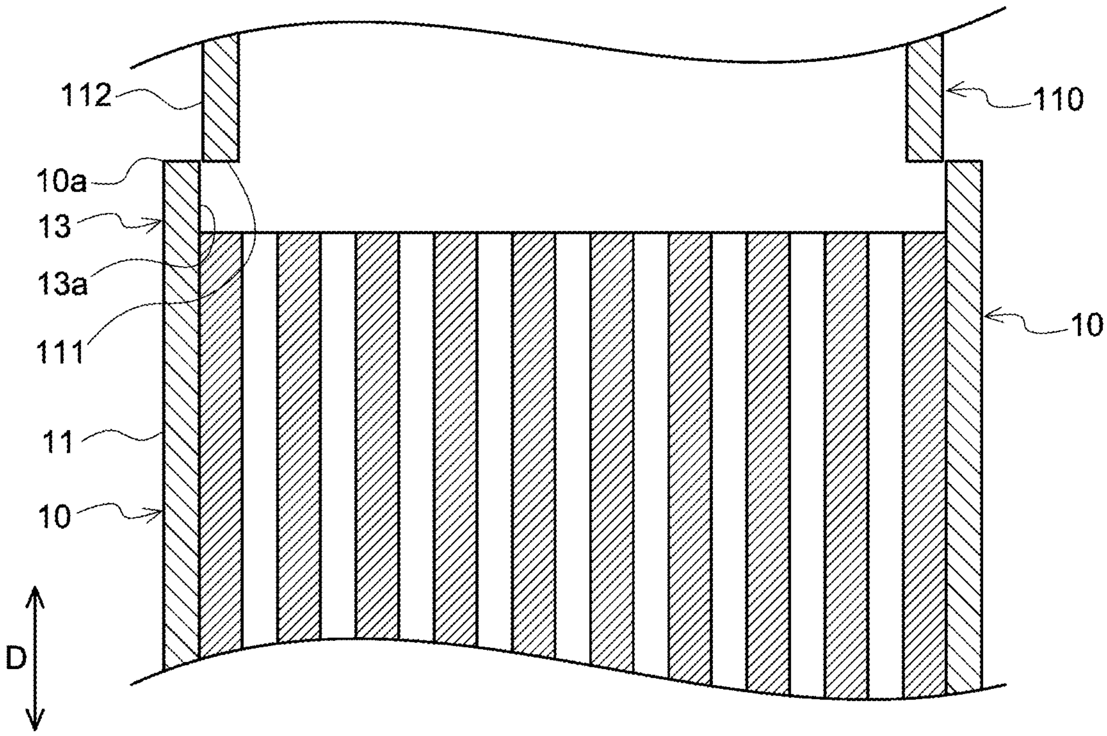
FIG. 8 is a view that schematically shows a state where a partitioning member is not properly arranged.
Figure 9:
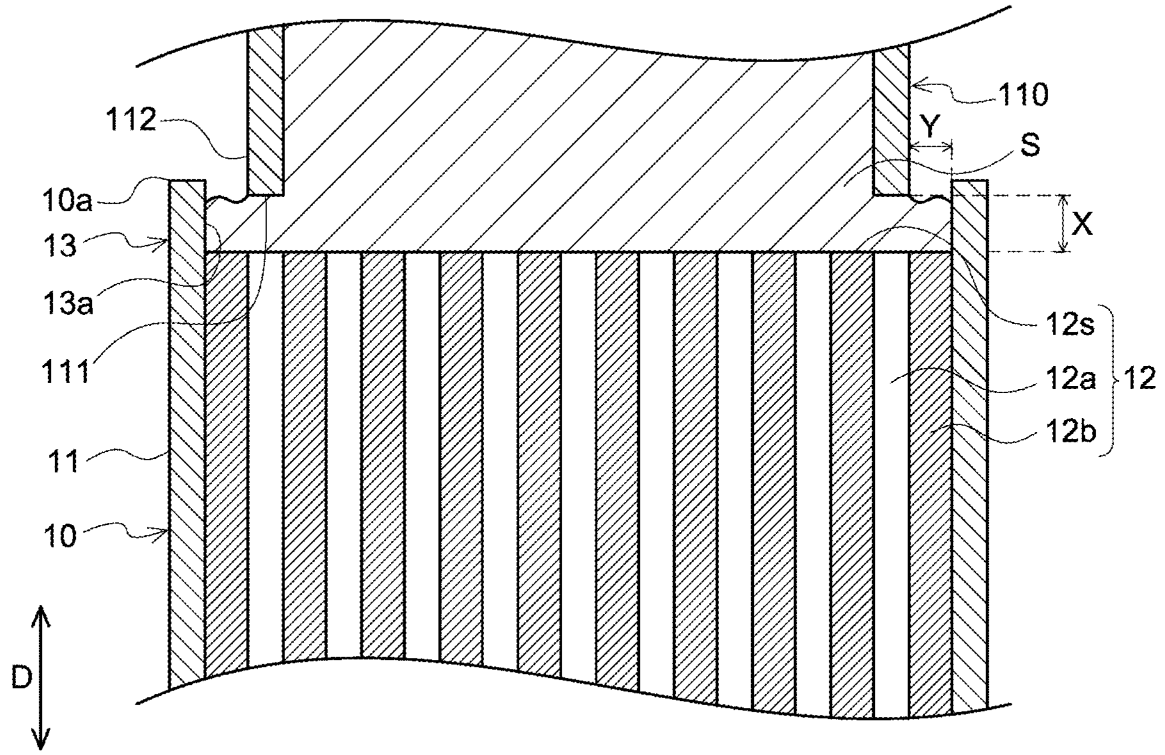
FIG. 9 is a view that schematically shows a situation where the supplying step is performed in a state of the partitioning member not properly arranged.
Figure 10:
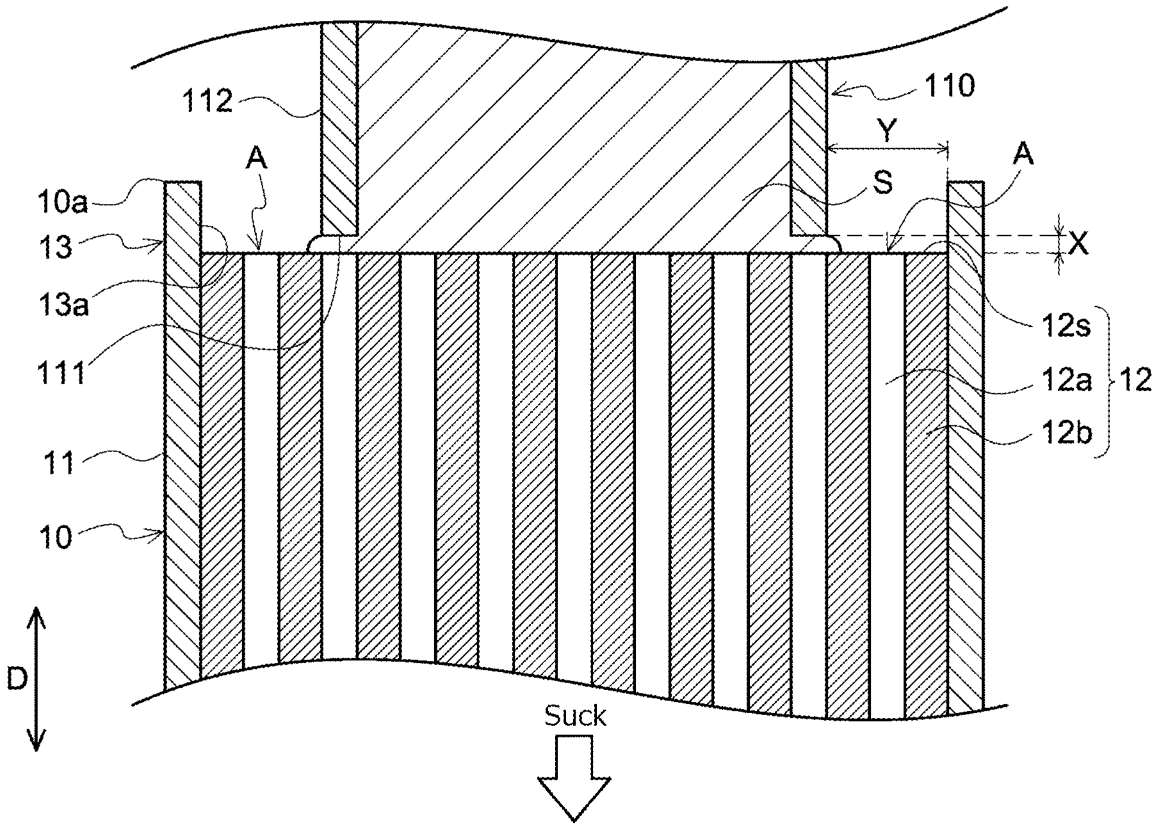
FIG. 10 is a view that schematically shows a situation where the sucking step is performed in the state of the partitioning member not properly arranged.

FIG. 8 is a view that schematically shows a state where the partitioning member 110 is arranged at not a suitable position. FIG. 9 is a view that schematically shows a situation where the later described supplying step was performed under the state of the partitioning member 110 having been arranged at not the suitable position. FIG. 10 is a view that schematically shows the later described sucking step was performed under the state of the partitioning member 110 having been arranged at not the suitable position. As shown in FIG. 8, even if the outer diameter of the partitioning member 110 has been designed to be smaller than the inner diameter of the outer cylinder 11, it is difficult to arrange the partitioning member 110 at the suitable position because the flange part 13 and the partitioning member 110 interfere with each other in a situation where the size is too closer. In addition, regarding the base material 10 including the flange part 13 as described above, the supplied catalyst layer forming slurry S is sometimes excessively diffused and then adheres to the flange part 13 (see FIG. 9). Alternatively, this slurry S is sometimes not diffused suitably, and then an uncoated part A might be caused on the honeycomb structure body 12 (see FIG. 10). Thus, in the herein disclosed manufacturing method, the partitioning member 110 is arranged to make a distance (a clearance X) between the lower end 111 of the partitioning member 110 and the end surface 12*s* at the upward side of the honeycomb structure body 12 and a distance (a clearance Y) between the outer wall 112 of the partitioning member 110 and the inner wall 13*a* of the flange part 13 be predetermined values. By doing this, it is possible to suppress the catalyst layer forming slurry S from adhering to the flange part 13 and the uncoated part A from being caused on the end surface 12*s* of the honeycomb structure body 12.

Particularly, as shown by FIG. 9, in a situation where the distance between the lower end 111 of the partitioning member 110 and the end surface 12*s* of the honeycomb structure body 12 is too long (in other words, in a situation where the clearance X is too large), it is difficult to hold the supplied catalyst layer forming slurry S at the inside of the partitioning member 110 regardless the viscosity of this slurry S. Therefore, the slurry S sometimes might outflow from the partitioning member 110 and adhere to the inner wall 13*a* of the flange part 13. In a situation where a large amount of slurry S adheres to the flange part 13, it might cause a welding failure, or the like, at a canning time, and thus it is not preferable. From a perspective described above, it is preferable that the clearance X is less than 3 mm, it is further preferable that the clearance is equal to or less than 2.5 mm, or it is furthermore preferable that the clearance is equal to or less than 2 mm. Additionally, as shown by FIG. 10, in a situation where the distance between the lower end 111 of the partitioning member 110 and the end surface 12*s* of the honeycomb structure body 12 is too short (in other words, in a situation where the clearance X is too small), the supplied catalyst layer forming slurry S is not properly diffused regardless the viscosity of this slurry S. Therefore, the uncoated part A might be caused on the honeycomb structure body 12. In the situation where the uncoated part A is caused on the honeycomb structure body 12, a suitable catalyst function cannot be exhibited at this portion, and thus it is not preferable. From a perspective described above, it is preferable that the clearance X is more than 0.2 mm, it is further preferable that the clearance is equal to or more than 0.3 mm, or it is furthermore preferable that the clearance is equal to or more than 0.5 mm. For example, it is good that the clearance X is equal to or more than 0.5 mm and not more than 2 mm.

On the other hand, as shown by FIG. 8, in a situation where the distance between the outer wall 112 of the partitioning member 110 and the inner wall 13*a* of the flange part 13 is too short (in other words, in a situation where the clearance Y is too small), the partitioning member 110 interferes with the flange part 13 when being arranged, and thus it cannot be suitably arranged. From a perspective described above, it is preferable that the clearance Y is more than 0.1 mm, it is further preferable that the clearance is equal to or more than 0.3 mm, or it is furthermore preferable that the clearance is equal to or more than 0.5 mm. Additionally, as shown by FIG. 10, in a situation where the distance between the outer wall 112 of the partitioning member 110 and the inner wall 13*a* of the flange part 13 is too long (in other words, in a situation where the clearance Y is too large), the supplied catalyst layer forming slurry S is not properly diffused even if it is sucked by the sucking member 120. Thus, the uncoated part A might be caused on the end surface 12*s* of the honeycomb structure body 12. From a perspective described above, it is preferable that the clearance Y is less than 3 mm, it is further preferable that the clearance is equal to or less than 2.5 mm, or it is furthermore preferable that the clearance is equal to or less than 2 mm. For example, it is good that the clearance Y is equal to or more than 0.5 mm and not more than 2 mm.

Figure 6:
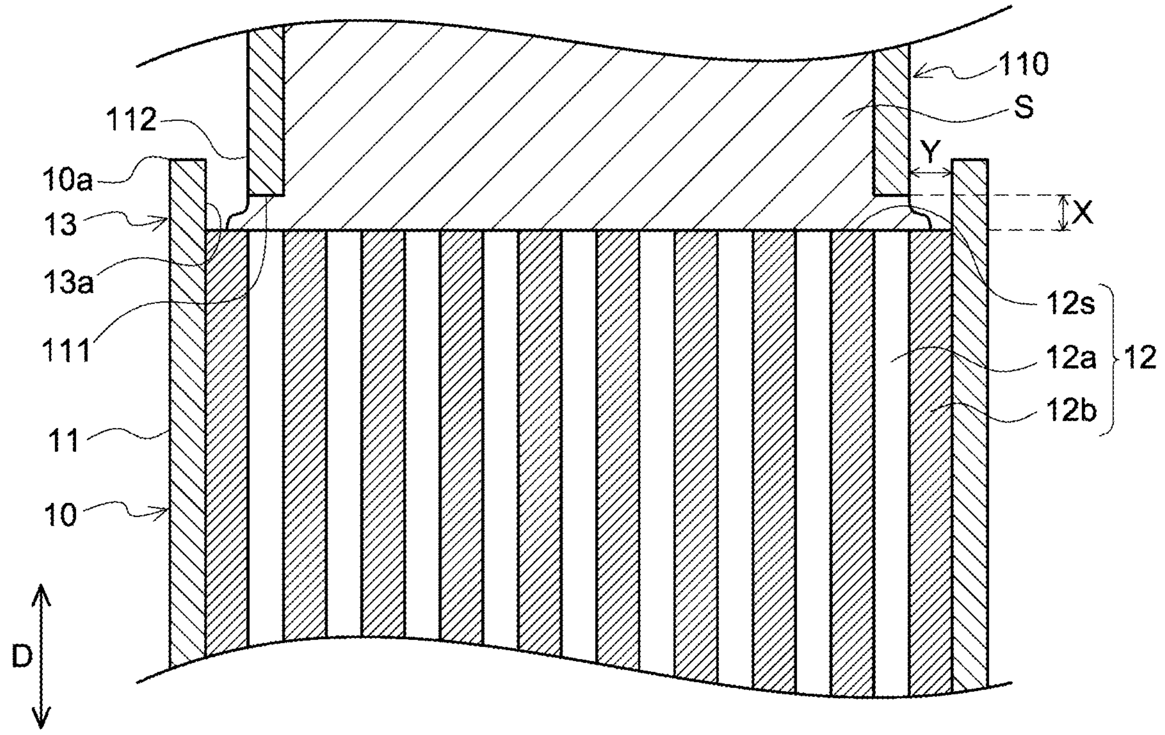
FIG. 6 is a view that schematically shows a supplying step in accordance with one embodiment.

FIG. 6 is a view that schematically shows a situation of the supplying step. A the supplying step S40, the supplying member 130 is used so as to supply the catalyst layer forming slurry S to the inside of the arranged partitioning member 110 described above. The supplying member 130 supplies a predetermined amount of slurry to the internal space of the partitioning member 110. The supplied slurry S is, as shown in FIG. 6, temporarily held by the partitioning member 110 and the end surface 12*s* of the honeycomb structure body 12.

The catalyst layer forming slurry S supplied at the supplying step S40 is a material used for forming the catalyst layer 20 on at least the surface of the partition wall 12*b* of the base material 10 described above. This catalyst layer forming slurry S contains at least a catalyst metal. The catalyst layer forming slurry S can contain the catalyst metal, a carrier that is for carrying this catalyst metal, and a dispersion medium that is for dispersing them.

The catalyst metal is, in the catalyst layer forming slurry S, contained to be an ion form, preferably. By doing this, it is possible, for example, to make a concentration of the catalyst metal in the catalyst layer forming slurry become uniform. As the catalyst layer forming slurry S, it is possible to use a slurry that contains a water-soluble metal salt containing the catalyst metal, a slurry that contains a complex of the catalyst metal, or the like. As the metal salt, it is possible to use, for example, a nitrate, such as nitric acid palladium and nitric acid rhodium; a sulfate, such as palladium sulfate and rhodium sulfate; or the like. As the complex of the catalyst metal, it is possible to use a tetraamine complex, a cyano complex, a halogeno complex, a hydroxy complex, or the like.

As the dispersion medium, it is possible without particular restriction to use a dispersion medium conventionally used for this kind of slurry. As the dispersion medium, for example, it is possible to use an aqueous dispersion medium, such as water, deionized water, and pure water.

It is good that the catalyst layer forming slurry S contains a thickening agent for adjusting the viscosity. As the thickening agent, it is possible to use, for example, a polyvinyl alcohol (PVA) base resin, a cellulose base resin, such as methyl cellulose, ethyl cellulose, hydroxy ethyl cellulose (HEC), and carboxy methyl cellulose, a rosin base resin, an acrylic resin, or the like.

The catalyst layer forming slurry S might, additionally, further contain a binder, a cocatalyst component, a dispersing agent, an additive agent of it, or the like. As the binder, for example, it is possible to use an alumina sol, a silica sol, or the like. As the cocatalyst component, it is possible to use an alkaline earth metal element, such as barium (Ba) and strontium (Sr).

Based on the present inventor's study, it has been found that, in a situation where the viscosity of the catalyst layer forming slurry S is not set within a suitable range even if the partitioning member 110 is arranged at the suitable position, the slurry S adheres to the flange part 13 and the uncoated part A is caused on the end surface 12*s* of the honeycomb structure body 12. In other words, by adjusting both the arrangement of the partitioning member 110 and the viscosity of the supplied catalyst layer forming slurry S, the slurry S does not adhere to the flange part 13 on the base material including the flange and thus it is possible to inhibit the uncoated part A from being caused on the honeycomb structure body 12.

Regarding the catalyst layer forming slurry S supplied at the supplying step S40 of the herein disclosed manufacturing method, under 25° C. environment, a viscosity $V_4$ at the time when a shearing speed is 4 $sec^{-1}$ and a viscosity $V_{150}$ at the time when the shearing speed is 150 $sec^{-1}$ are adjusted to be within predetermined ranges. Incidentally, in the present description, the viscosity $V_4$ at the time when the shearing speed is 4 $sec^{-1}$ represents a viscosity (mPa·s) that is measured with an E-type viscometer (made by Toki Sangyo Co., Ltd., TVE-35H) under a measurement temperature being 25° C. at the shearing speed being 4 $sec^{-1}$. The viscosity $V_{150}$ at the time when the shearing speed is 150 $sec^{-1}$ represents a viscosity (mPa·s) that is measured with the E-type viscometer similar to the above described one under the measurement temperature being 25° C. at the shearing speed being 150 $sec^{-1}$. In an explanation described below, the wording "viscosity $V_4$ at the time when the shearing speed is 4 $sec^{-1}$" might be referred to as "low shearing viscosity $V_4$", and the wording "viscosity $V_{150}$ at the time when the shearing speed is 150 $sec^{-1}$" might be referred to as "high shearing viscosity $V_{150}$".

The low shearing viscosity $V_4$ of the catalyst layer forming slurry S could be a viscosity while assuming a situation where the slurry was supplied to the honeycomb structure body 12. In a situation where the low shearing viscosity $V_4$ of the slurry S is too low, it is difficult to hold the slurry S at the inside of the partitioning member 110 even if the clearance X between the lower end 111 of the partitioning member 110 and the end surface 12*s* of the honeycomb structure body 12 has been set within a suitable range, thus this slurry S could outflow from the partitioning member 110, and then a large amount of it could adhere to the inner wall 13*a* of the flange part 13. For properly holding this slurry S at the inside of the partitioning member 110, it is preferable to adjust the low shearing viscosity $V_4$ of the slurry S in accordance with the clearance X. From a perspective described above, the catalyst layer forming slurry S is prepared to make the low shearing viscosity $V_4$ satisfy Formula (1): $V_4 \geq 2500X$. Additionally, in a situation where the low shearing viscosity $V_4$ of the slurry S is too high, the later described high shearing viscosity $V_{150}$ could be increased, the slurry S could not be suitably diffused, the uncoated part A could be caused on the honeycomb structure body 12, and thus it is not preferable. The viscosity $V_4$ at the time when the shearing speed of this slurry S is 4 $sec^{-1}$, which is not particularly restricted, is preferably, for example, less than 25000 mPa·s, further preferably equal to or less than 20000 mPa·s, or preferably in particular equal to or less than 15000 mPa·s. The viscosity $V_4$ at the time when the shearing speed of the catalyst layer forming slurry S is 4 $sec^{-1}$ is preferably, for example, equal to or more than 3300 mPa·s and not more than 20000 mPa·s, or further preferably equal to or more than 3300 mPa·s and not more than 15000 mPa·s, or might be equal to or more than 4000 mPa·s and not more than 10000 mPa·s.

The high shearing viscosity $V_{150}$ of the catalyst layer forming slurry S could be a viscosity while assuming the situation where the slurry was sucked. In a situation where the high shearing viscosity $V_{150}$ of the slurry S is too high, even if the clearance X is set within a suitable range and the shearing stress is applied by the suck, the slurry S could not be suitably diffused and the uncoated part A could be caused on the honeycomb structure body 12. For diffusing this slurry S over the whole surface of the honeycomb structure body 12, it is preferable to adjust the high shearing viscosity $V_{150}$ of the slurry S in accordance with the clearance X. From a perspective described above, the catalyst layer forming slurry S is prepared to make the high shearing viscosity $V_{150}$ satisfy Formula (2): $V_{150} \leq 1150X$. In addition, a lower limit of the high shearing viscosity $V_{150}$ of the slurry S, which is not particularly restricted, is preferably, for example, more than 240 mPa·s, further preferably equal to or more than 300 mPa·s, or preferably in particular equal to or more than 320 mPa·s, because the high shearing viscosity $V_{150}$ is reduced in accordance with the reduction in the low shearing viscosity $V_4$. The viscosity $V_{150}$ at the time when the shearing speed of the catalyst layer forming slurry is 150 $sec^{-1}$ is preferably, for example, equal to or more than 300 mPa's and not more than 1200 mPa·s, or further preferably equal to or more than 320 mPa·s and not more than 1000 mPa·s, or might be equal to or more than 320 mPa·s and not more than 900 mPa·s.

Figure 7:
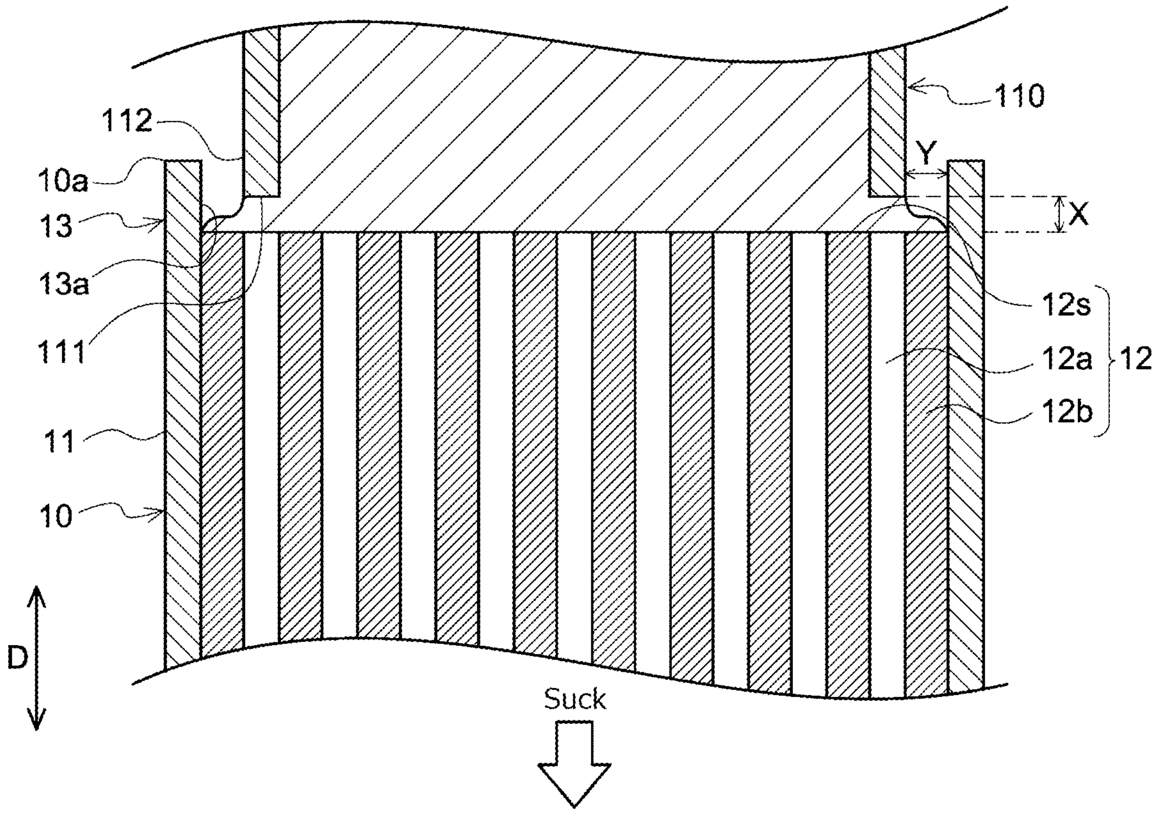
FIG. 7 is a view that schematically shows a sucking step in accordance with one embodiment.

FIG. 7 is a view that schematically shows a situation of the sucking step. At the sucking step S50, the catalyst layer forming slurry S supplied to the end surface 12*s* of the honeycomb structure body 12 at the top end 10*a* side of the base material 10 is sucked from the lower end 10*b* side by the sucking member 120, and then this slurry S is introduced to the inside of the base material 10. The sucking step S50 is performed so as to apply the shearing stress on the catalyst layer forming slurry S. The slurry S used in the herein disclosed manufacturing method is prepared to make the viscosity be reduced in response to the applied shearing stress. Thus, by making the slurry S supplied to the end surface 12*s* at the upward side of the honeycomb structure body 12 at the sucking step S50 be sucked from the downward side, the viscosity of the slurry S is suitably reduced and it is possible to diffuse the slurry S over the end surface 12*s* of the honeycomb structure body 12. Therefore, it is possible to suppress the uncoated part A from being caused.

A sucking condition is suitably changed on the basis of a size or a kind of the base material, a kind of the catalyst layer forming slurry S, or the like, and is not particularly restricted. As one example, regarding a sucking speed, the arrangement can be implemented to make a wind speed in the cell of the base material be about 20 m/s to 80 m/s (for example, 30 m/s to 60 m/s). In addition, a sucking time is not particularly restricted, but it is good to be, for example, about 1 second to 20 seconds (for example, 3 seconds to 15 seconds).

By performing a drying step and a baking step on the base material 10 in which the slurry was introduced, it is possible to manufacture the exhaust gas purification catalyst 1. The drying step can be performed in a condition similar to a dry operation conventionally performed for this kind of technique, and is not particularly restricted. For example, it is good to dry at a temperature being about 50° C. to 200° C. for 1 minute to 30 minutes. In addition, the baking step is not particularly restricted, either. For example, it is good to bake at a temperature being about 400° C. to 1000° C. for 20 seconds to 5 hours.

The above described exhaust gas purification catalyst can be suitably applied to purify the exhaust gas exhausted from an internal combustion engine of a vehicle, such as car and truck, including a motorcycle and a motorized bicycle, a marine product, such as ship, tanker, water bike, personal watercraft, and outboard motor, a gardening product, such as grass mower, chainsaw, and trimmer, a leisure product, such as golf cart and four-wheeled buggy, a power generating equipment, such as cogeneration system, a waste incinerator, or the like.

Below, a test example of the herein disclosed technique would be explained. Incidentally, the below described explanation is not intended to restrict the herein disclosed technique to the test example.

Example 1

A manufacturing apparatus as shown in FIG. 3 was used to manufacture the exhaust gas purification catalyst. At first, as the base material, a metal base material being a straight flow type and being formed in a cylindrical shape (made from stainless steel, length in cylinder axis direction: 65 mm, inner diameter 130 mm, cell number: 600 cpsi) was prepared that includes an outer cylinder having a flange part and includes a honeycomb structure body. This metal base material, which included the flange parts at the both end parts in the cylinder axis direction and in which a length of each flange part along the cylinder axis direction was 6 mm, was prepared. In addition, a partitioning member formed in a cylindrical shape (length in cylinder axis direction: 9 mm, outer diameter: 128 mm) was prepared.

Then, a catalyst layer forming slurry was prepared in which a catalyst metal (Pd), a carrier (alumina: $Al_2O_3$), a water, and a thickening agent (hydroxy ethyl cellulose (HEC)) were mixed. Regarding the slurry of Example 1, an amount of the thickening agent was adjusted to make the viscosity $V_4$ at the time of the shearing speed being 4 $s^{-1}$ become 5000 mPa's and make the viscosity $V_{150}$ at the time of the shearing speed being 150 $s^{-1}$ become 320 mPa·s. Incidentally, the viscosity $V_4$ described above is a value that has been measured with an E-type viscometer (made by Toki Sangyo Co., Ltd., TVE-35H) at a measurement temperature being 25° C. at the shearing speed being 4 $sec^{-1}$. In addition, the viscosity $V_{150}$ is a value that has been measured with a similar E-type viscometer, at a measurement temperature being 25° C., at the shearing speed being 150 $s^{-1}$.

The manufacturing apparatus as shown in FIG. 3 was used so as to manufacture the exhaust gas purification catalyst. At first, the prepared base material described above was set on the holding member. At that time, the base material was held by the holding member to coincide the cylinder axis of the base material with the vertical direction. Next, the prepared partitioning member described above was arranged to make the lower end of the partitioning member and the end surface at the upward side of the honeycomb structure body be opposed to each other. At that time, the partitioning member was arranged to make the clearance X between the end surface of the honeycomb structure body and the lower end of the partitioning member be 1 mm and to make the clearance Y between the inner wall of the flange part and the outer wall of the partitioning member be 1 mm. Then, 95 g of the catalyst layer forming slurry of the prepared Example 1 described above was supplied to the inside of the partitioning member. After that, the slurry was sucked from an end surface side opposite to the end surface onto which the slurry was supplied. Sucking the slurry was performed by operating a sucking device for 3 seconds under a condition where the wind speed in the cell of the base material was 45 m/s. Then, the base material on which the catalyst layer forming slurry was supplied was removed from the manufacturing apparatus, dried, and then baked, so that the exhaust gas purification catalyst of Example 1 was obtained.

Example 2 to Example 20

The amount of each thickening agent was adjusted to make the low shearing viscosity $V_4$ of the catalyst layer forming slurry and the high shearing viscosity $V_{150}$ satisfy values shown in Table 1. In addition, a size and an arrangement of each partitioning member was adjusted to make the clearance X between the end surface of the honeycomb structure body and the lower end of the partitioning member and the clearance Y between the inner wall of the flange part and the outer wall of the partitioning member satisfy the values shown in Table 1. The other things were performed similarly to Example 1, so that the exhaust gas purification catalysts of Example 2 to Example 20 were manufactured.

Example 21

Regarding the catalyst layer forming slurry, the amount of the thickening agent was adjusted to make the viscosity $V_4$ become 6600 mPa·s at the time of the shearing speed being 4 $s^{-1}$ and to make the viscosity $V_{150}$ become 500 mPa's at the time of the shearing speed being 150 $s^{-1}$. In Example 21, without the partitioning member, the prepared slurry described above was supplied to the end surface of the honeycomb structure body. The other things were performed similarly to Example 1, so that the exhaust gas purification catalyst of Example 21 was manufactured.

<Flange Part Adhesion Height and Evaluation of Uncoated>

On the flange part of the exhaust gas purification catalyst of each example manufactured as described above, a height of the adhering catalyst layer forming slurry was measured. In particular, adhesion heights on which the catalyst layer forming slurry was adhered (distances from the end surface of the honeycomb structure body) at three arbitrary points of the flange part were measured. Then, a mean of the adhesion heights at the three points described above was calculated, so that a flange part adhesion height of each example was obtained. One whose flange part adhesion height was equal to or less than 50% of the height of the flange part (in other words, equal to or less than 3 mm) was evaluated to be good. In addition, regarding the exhaust gas purification catalyst of each example, the end surface of the honeycomb structure body at a side to which the catalyst layer forming slurry was supplied (in other words, a side on which the partitioning member was arranged) was observed with a microscope, and thus a presence or an absence of the uncoated part was confirmed. One on which the uncoated part was not present was evaluated to be good.

Figure 11:
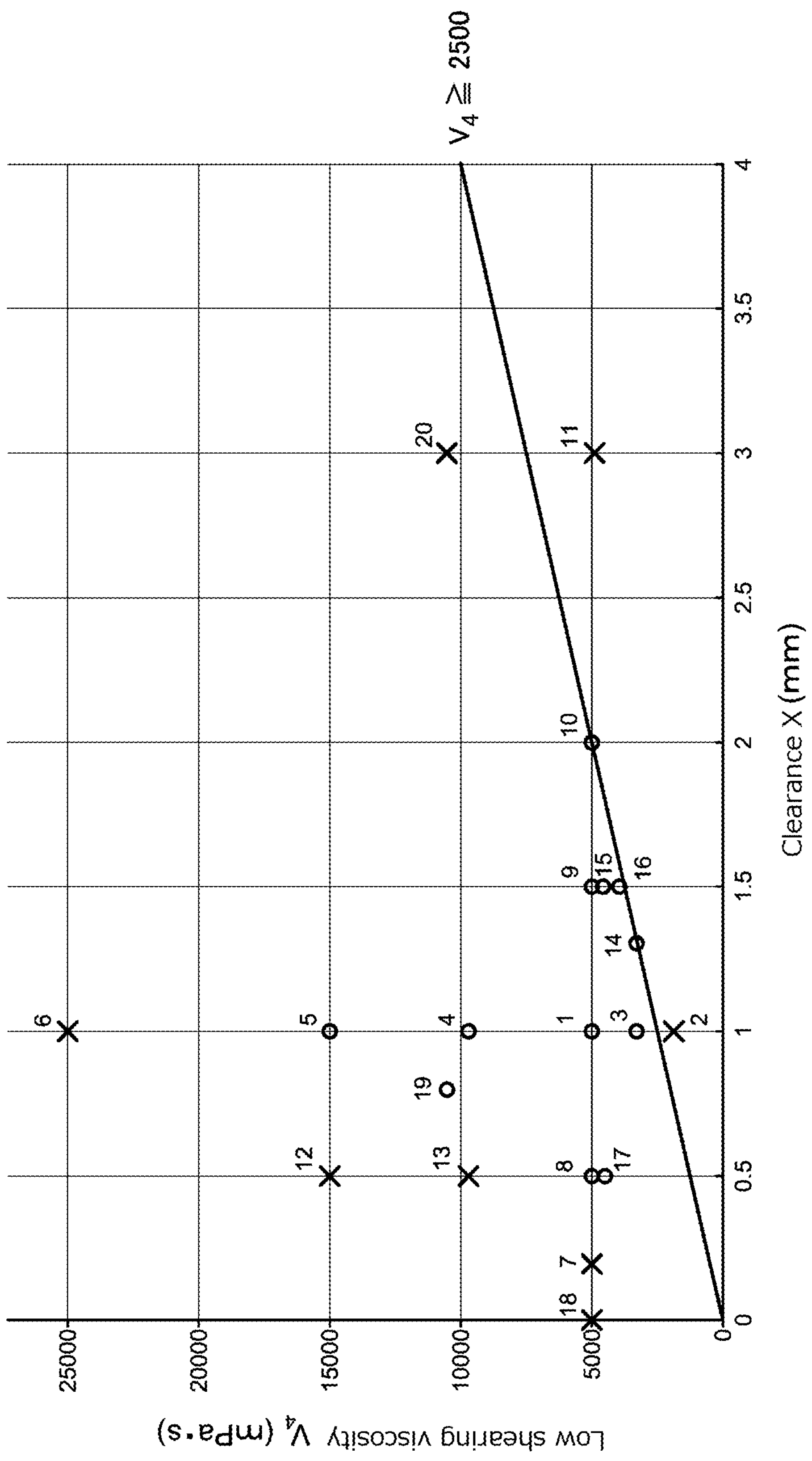
FIG. 11 is a view regarding Example 1 to Example 20 that shows a relation between a viscosity $V_4$ at a shearing speed being 4 $sec^{-1}$ (a low shearing viscosity $V_4$) and a clearance X.
Figure 12:
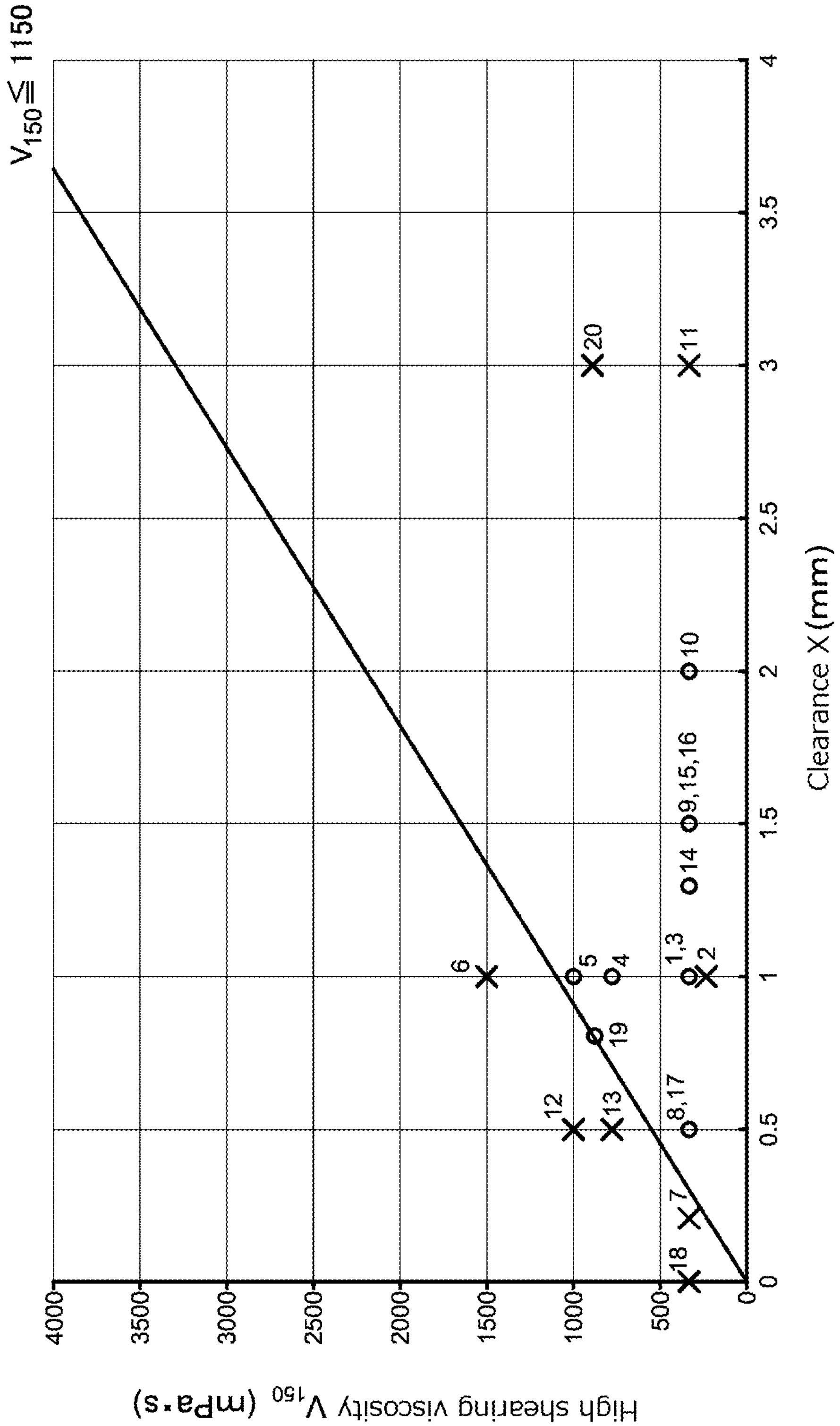
FIG. 12 is a view regarding Example 1 to Example 20 that shows a relation between a viscosity $V_{150}$ at the shearing speed being 150 $sec^{-1}$ (a high shearing viscosity $V_{150}$) and the clearance X.

Results of them are shown in Table 1. Incidentally, in a column of "evaluation" of Table 1, one in which the flange part adhesion height is equal to or less than 3 mm and in which the uncoated part is not present is evaluated to be good and is shown with "○", and one in which the flange part adhesion height is more than 3 mm and/or in which the uncoated part is present is evaluated to be not good and is shown with "x". In addition, regarding Example 1 to Example 20, a relation between the viscosity $V_4$ at the time of the shearing speed of the catalyst layer forming slurry being 4 $s^{-1}$ and the clearance X is shown in FIG. 11, and a relation between the viscosity $V_{150}$ at the time of the shearing speed of the catalyst layer forming slurry being 150 $s^{-1}$ and the clearance X is shown in FIG. 12. Incidentally, in FIG. 11 and FIG. 12, similarly, one in which the flange part adhesion height is equal to or less than 3 mm and in which the uncoated part is not present is evaluated to be good and is shown with "○", and one in which the flange part adhesion height is more than 3 mm and/or in which the uncoated part is present is evaluated to be not good and is shown with "x".

TABLE 1

[Table 1]

| | Presence/ Absence of Partitioning Member | Clearance X (mm) | Clearance Y (mm) | Low Shearing Viscosity $V_4$ (mPa·s) | High Shearing Viscosity $V_{150}$ (mPa·s) | Flange Adhesion Mean Height (mm) | Presence/Absence of Uncoated Part | Evaluation |
|---|---|---|---|---|---|---|---|---|
| Example 1 | Presence | 1 | 1 | 5000 | 320 | 0 | Absence | ○ |
| Example 2 | Presence | 1 | 1 | 2000 | 240 | 3.5 | Absence | x |
| Example 3 | Presence | 1 | 1 | 3300 | 320 | 0 | Absence | ○ |
| Example 4 | Presence | 1 | 1 | 9600 | 760 | 0 | Absence | ○ |
| Example 5 | Presence | 1 | 1 | 15000 | 1000 | 0 | Absence | ○ |
| Example 6 | Presence | 1 | 1 | 25000 | 1500 | 0 | Presence | x |
| Example 7 | Presence | 0.2 | 1 | 5000 | 320 | 0 | Presence | x |
| Example 8 | Presence | 0.5 | 1 | 5000 | 320 | 0 | Absence | ○ |
| Example 9 | Presence | 1.5 | 1 | 5000 | 320 | 1.7 | Absence | ○ |
| Example 10 | Presence | 2 | 1 | 5000 | 320 | 2 | Absence | ○ |
| Example 11 | Presence | 3 | 1 | 5000 | 320 | 3.5 | Absence | x |
| Example 12 | Presence | 0.5 | 1 | 15000 | 1000 | 0 | Presence | x |
| Example 13 | Presence | 0.5 | 1 | 9600 | 760 | 0 | Presence | x |
| Example 14 | Presence | 1.3 | 1 | 3300 | 320 | 2 | Absence | ○ |
| Example 15 | Presence | 1.5 | 2 | 4600 | 320 | 3 | Absence | ○ |
| Example 16 | Presence | 1.5 | 1 | 4000 | 320 | 3 | Absence | ○ |
| Example 17 | Presence | 0.5 | 0.5 | 4600 | 320 | 0 | Absence | ○ |
| Example 18 | Presence | 0 | 1 | 5000 | 320 | 0 | Presence | x |
| Example 19 | Presence | 0.8 | 1 | 10420 | 890 | 0 | Absence | ○ |
| Example 20 | Presence | 3 | 1 | 10420 | 890 | 4 | Absence | x |
| Example 21 | Absence | — | — | 6600 | 500 | 6 | Absence | x |

As shown in Table 1, FIG. 11, and FIG. 12, it can be understood that each of Example 1, Example 3 to Example 5, Example 8 to Example 10, Example 14 to Example 17, and Example 19, in which the partitioning member is arranged to make the clearance X become equal to or more than 0.5 mm and not more than 2 mm and the clearance Y become equal to or more than 0.5 mm and not more than 2 mm, in which the low shearing viscosity $V_4$ of the catalyst layer forming slurry satisfies Formula (1): $V_4 \geq 2500X$, and in which the high shearing viscosity $V_{150}$ satisfies Formula (2): $V_{150} \leq 1150X$, has the flange part adhesion height being equal to or less than 3 mm and does not have the uncoated part. In other words, by arranging the partitioning member so as to have the clearances X and Y being within the above described ranges and by adjusting the viscosity of the supplied slurry to be within the above described range, it is possible to implement the manufacturing method that can suppress the slurry from adhering to the flange part and can suppress the uncoated part from being caused.

Above, some embodiments of the present disclosure have been explained, but the above described embodiments are merely examples. The present disclosure can be implemented in various other forms, too. The present disclosure can be executed, based on the contents disclosed in the present description and the technical common sense in the present field. The technique recited in the appended claims includes variously deformed or changed versions of the embodiments that have been illustrated above. For example, it is possible to replace a part of the above described embodiment with another modified aspect, and it is also possible to add another modified aspect to the above described embodiment. In addition, unless a technical feature is explained to be essential, this technical feature can be appropriately deleted.

The invention claimed is:

1. A manufacturing method of an exhaust gas purification catalyst that is configured to purify an exhaust gas exhausted from an internal combustion engine, the manufacturing method comprising:

a step for preparing a base material that comprises an outer cylinder and a honeycomb structure body being arranged at an inside of the outer cylinder and being formed in a manner where the exhaust gas can flow, the honeycomb structure body having a length in a cylinder axis direction being shorter than the outer cylinder, the outer cylinder comprising a flange part protruding toward the cylinder axis direction more than an end surface of the honeycomb structure body on at least one of end parts toward the cylinder axis direction;

a step for holding the base material to make a cylinder axis of the base material approximately coincide with a vertical direction;

a step for inserting a partitioning member, which is formed in a cylindrical shape whose outer diameter is smaller than an inner diameter of the outer cylinder, from a top end of the base material, and then arranging so as to make the end surface at an upward side of the honeycomb structure body be opposed to a lower end of the partitioning member;

a step for supplying a catalyst layer forming slurry, which comprises a catalyst metal, to the partitioning member; and a step for sucking the catalyst layer forming slurry from a lower end of the base material, wherein at the arranging step, the partitioning member is arranged to make a clearance X between the end surface of the honeycomb structure body and the lower end of the partitioning member, which are arranged to be opposite to each other, become equal to or more than 0.5 mm and not more than 2 mm and to make a value of a clearance Y between an inner wall of the flange part of the base material and an outer wall of the partitioning member become equal to or more than 0.5 mm and not more than 2 mm, the catalyst layer forming slurry supplied at the supplying step satisfies Formula (1): $V_4 \geq 2500$ X; and Formula (2): $V_{150} \leq 1150X$, when a viscosity at a time of a shearing speed being 4 $sec^{-1}$ is treated as $V_4$ (mPa·s)

and the viscosity at a time of a shearing speed being 150 $sec^{-1}$ is treated as $V_{150}$ (mPa·s).

2. The manufacturing method according to claim 1, wherein the catalyst layer forming slurry supplied at the supplying step is prepared to make the viscosity $V_4$ at the time when the shearing speed is 4 $sec^{-1}$ become equal to or less than 20000 mPa·s.

3. The manufacturing method according to claim 1, wherein the catalyst layer forming slurry supplied at the supplying step is prepared to make the viscosity $V_{150}$ at the time when the shearing speed is 150 $sec^{-1}$ become equal to or more than 300 mPa·s.

4. The manufacturing method according to claim 2, wherein the catalyst layer forming slurry supplied at the supplying step is prepared to make the viscosity $V_{150}$ at the time when the shearing speed is 150 $sec^{-1}$ become equal to or more than 300 mPa·s.

* * * * *